United States Patent

[11] 3,622,245

| [72] | Inventor | Alvin L. Rasmussen |
| | | Boulder, Colo. |
| [21] | Appl. No. | 44,955 |
| [22] | Filed | June 10, 1970 |
| [45] | Patented | Nov. 23, 1971 |
| [73] | Assignee | The United States of America as represented by the Secretary of Commerce |

[54] DOUBLE PLATE CALORIMETER FOR MEASURING THE REFLECTIVITY OF THE PLATES AND THE ENERGY IN A BEAM OF RADIATION
9 Claims, 5 Drawing Figs.

[52] U.S. Cl. ............................................. 356/216,
73/190, 350/299, 356/234, 356/114
[51] Int. Cl. ..................................................... G01J 1/56,
G01k 17/00
[50] Field of Search ........................................... 356/114,
118, 226, 209, 234, 216; 73/190; 250/83.3;
350/299

[56] References Cited
UNITED STATES PATENTS
| 3,459,945 | 8/1969 | Astheimer et al. | 73/190 |
| 3,464,267 | 9/1969 | Ehrlich et al. | 73/190 |
| 3,422,678 | 1/1969 | Murray | 356/118 |
| 3,307,448 | 3/1967 | Stimler et al. | 331/94.5 |

Primary Examiner—Ronald L. Wibert
Assistant Examiner—J. Rothenberg
Attorneys—David Robbins and Alvin J. Englert ABSTRACT: (1) A beam of radiation polarized parallel or perpendicular to the plane of incidence impinges on a first metal plate mirror and is reflected to a second metal plate mirror. A portion of the beam energy is absorbed and converted to heat by the plates. A pair of signals are generated, each having a magnitude dependent upon the level of energy absorbed by the related plate. (2) The beam then impinges on the second plate mirror and is reflected to the first while another pair of signals are generated. The magnitude of each signal is used (3) to calculate the reflectivities of the plates and (4) to calculate the energy in the beam. To evaluate the energy of the quadrature components of a beam of any polarization, the second plate is rotated 90° around the impinging beam as an axis, step 1 is repeated, and the magnitudes of the signals are used to calculate the component energy values.

PATENTED NOV 23 1971　　3,622,245

INVENTOR
Alvin L. Rasmussen

BY
David Robbins
ATTORNEY

INVENTOR

Alvin L. Rasmussen

DOUBLE PLATE CALORIMETER FOR MEASURING THE REFLECTIVITY OF THE PLATES AND THE ENERGY IN A BEAM OF RADIATION

BACKGROUND OF THE INVENTION

Disk and cone calorimeters are used in the prior art to measure the energy in a laser beam. In these devices laser energy is directed onto a thin disk or a hollow cone and the temperature rise, caused by the absorption of all or part of the energy, is measured. The energy in the beam can be determined in principle from a knowledge of the physical dimensions and constants of the calorimeters. However, they have a relatively slow response time (compared with the calorimeter described here) during which energy is lost to the surroundings and the calorimeter temperature is not uniform. For acceptable accuracy, the data representing the energy being measured must be compared with data obtained during a previous calibration of the calorimeter against a standard energy source.

When a calorimeter uses a disk, it usually has a black surface and only low levels of energy and power can be measured without destroying the surface. When a cone is used, the beam being measured tends to concentrate in and burn through its apex at high power and energy levels.

In contrast to the prior art, in the calorimeter described here the energy in the beam is sampled to measure the total beam energy and the rest of the beam, which is calibrated, may interact with another material or device as desired in a particular application. Compared with prior devices, the calorimeter may be used to measure a wide range of energy levels, e.g., approximately 0.01 j./cm.$^2$ to 50 j./cm.$^2$ (using a laser beam in the pulsed normal mode). It has a faster response time and reaches substantially uniform temperature sooner than prior art devices, which provides improved accuracy. Again, a reference standard is not required for calibration.

In addition to the noted advantages, the calorimeter may be used to evaluate the reflectivities of its double plate mirrors and may also be used to evaluate the quadrature components of polarization of the beam.

SUMMARY OF THE INVENTION

In accordance with the present invention, a first plate mirror is positioned to reflect an impinging beam of radiation to a second plate mirror, and an arrangement is provided for developing a first and second signal having magnitudes that are dependent upon the level of energy absorbed by the first and second mirror, respectively.

When the energy in a beam of radiation polarized parallel or perpendicular to the plane of incidence and the reflectivities of the plate mirrors are to be determined, the beam is directed onto the first plate and is reflected to the second. A portion of the energy in the beam is absorbed and converted to heat by the first and second plate. This causes a pair of signals to be generated, each having a magnitude dependent upon the energy absorbed by one of the plates. The beam is then directed so that it impinges on the second plate mirror and is reflected to the first. Another pair of signals are generated, each having a magnitude that is a function of the energy absorbed by the related plate. The magnitude of each signal is measured, and the measured values are employed to calculate the reflectivities of the plate mirrors and the energy in the beam.

When the energy in the quadrature components of polarization of a beam of any polarization are to be determined, the second plate is rotated 90° around the impinging beam as an axis. The first step of the procedure, described in the paragraph above, is repeated and the magnitudes of the measured signals are used to calculate the component energy values.

DESCRIPTION OF THE PREFERRED EMBODIMENT

Figure 1:
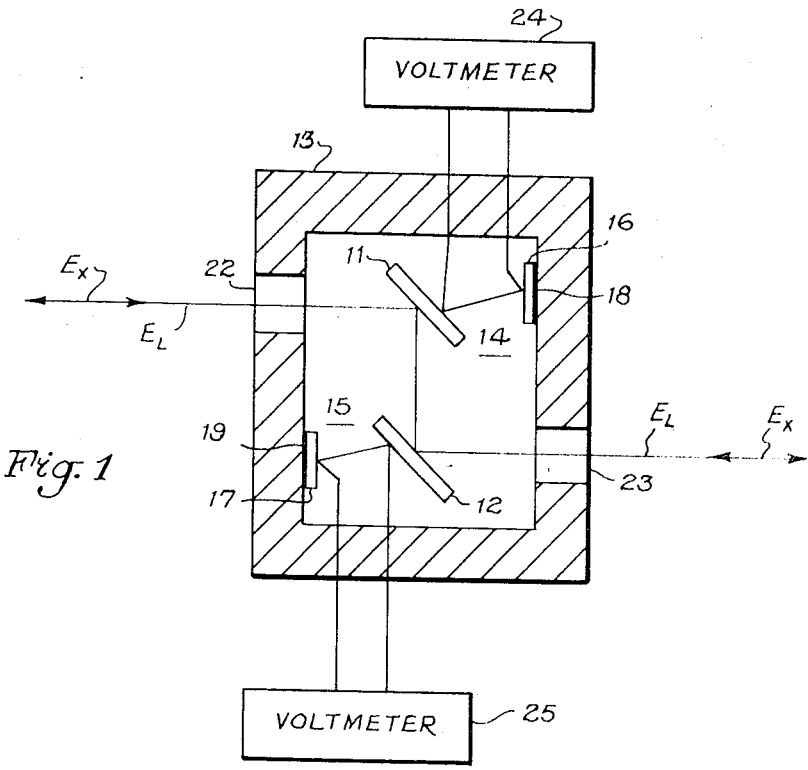
FIG. 1 represents an embodiment of the present invention.

With reference to FIG. 1, plate mirrors 11 and 12 have optically finished faces which have negligible scatter. (Any number of mirrors may be added to the calorimeter.) The plates may be fabricated of such materials as a thin layer of nickel or gold on silver, solid gold, polycrystalline 99 percent aluminum, and single crystal pure aluminum. These materials are preferred because of their high thermal conductivity and diffusivity, reflectivities, and polishing qualities.

Plate mirrors 11 and 12 are supported in enclosure 13 by a conventional arrangement, such as polystyrene foam, not shown. The beam of radiation $E_L$ may have a wavelength in the ultraviolet to infrared range depending upon such factors as the orientation of plate mirrors 11 and 12 relative to the beam, and the material and finish of the mirrors. The beam may comprise coherent or noncoherent light and may be pulsed or cw, polarized or unpolarized.

The hot junctions of copper-constantan thermocouples 14 and 15 are attached with low-temperature indium solder to plates 11 and 12, respectively, and the cold junctions are attached to copper blocks 16 and 17. The blocks are mounted on thin mica sheets 18 and 19 which are positioned on enclosure 13. The enclosure is fabricated of aluminum and serves as a heat sink.

As shown in FIG. 1, after the incoming beam of radiation $E_L$ enters opening 22 it impinges on plate mirror 11, is reflected to 12, and is then reflected out of opening 23. The plate mirrors 11 and 12 absorb energies $E_1$ and $E_2$ which are portions of the energy in the beam. The rest of the beam energy passes through opening 23, as represented by $E_x$, and is free to interact with another medium. As the absorbed energies are converted to heat in plate mirrors 11 and 12, thermocouple 14 generates a voltage that is proportional to the temperature difference between plate 11 and enclosure 13 and is read on voltmeter 24. Likewise, thermocouple 15 generates a voltage proportional to the temperature difference between plate 12 and the enclosure and this voltage is measured by voltmeter 25.

The energies $E_1$ and $E_2$ absorbed by plate 11 and 12, respectively, are determined using the expression $$E_n = V_n/C_n \quad (1)$$

where $E_n$ = energy absorbed by a plate
$V_n$ = thermocouple output voltage $$C_n = \frac{\text{thermocouple sensitivity}}{\text{heat capacity of plate and solder}}$$

$$= \frac{V/°C.}{J/°C.}$$

The sensitivity of thermocouples 14 and 15 may be determined by a technique described in "Measurement and Data" by L. L. Sparks and R. L. Powell published in (A & R Roe Printers, St. Joseph, Mich.), 1, No. 2, 82–90 (March-April 1967). Specific heat data, used in evaluating the heat capacity of plate and solder, may be obtained from "Selected Values of Thermodynamic Properties of Metals and Alloys" by R. Hultgreen, R. L. Orr, P. D. Anderson, and K. K. Kelley (John Wiley & Sons, New York, 1963).

Figure 3:
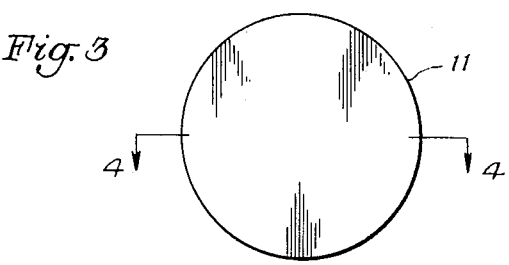
FIG. 3 illustrates an enlarged view of a plate mirror used in FIGS. 1 and 2.
Figure 4:
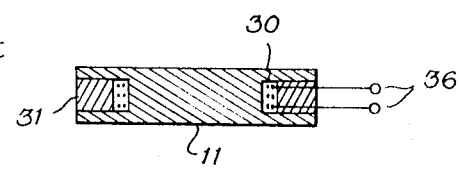
FIG. 4 represents a section of the plate mirror shown in FIGS. 1 and 2.
Figure 5:
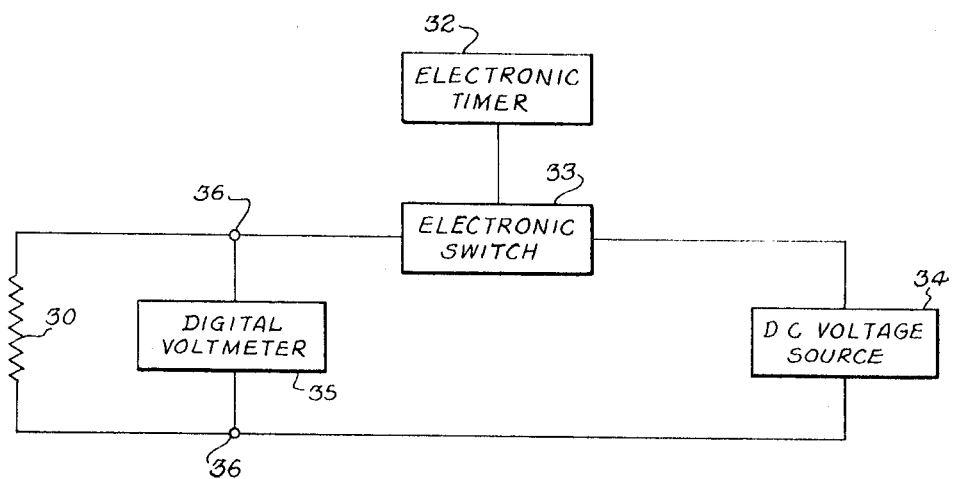
FIG. 5 presents a circuit for determining the value of $C_n$ in equation 1.

The arrangement shown in FIGS. 3 to 5 may also be used to determine the value of $C_n$. Fig. 4 represents a section of plate mirror 11 taken along line 4—4 in FIG. 3. Heater coil 30 has a resistance R and is positioned in a channel in plate 11. Metal ring 31, which is also positioned in the channel, covers the coil. The ends of the heater coil are connected to terminals 36 which are located on a wall of enclosure 13 by conventional means, not shown. It is noted that another type of heater element could be used in place of coil 30 and that plate 12 is constructed in the same manner as plate 11.

When it is desired to evaluate $C_n$, electronic timer 32 is set to close electronic switch 33 for a selected time interval T during which the output of DC voltage source 34 is connected across heater coil 30 and digital voltmeter 35 measures the magnitude of the voltage E developed across 30. Voltage $V_{nDC}$ is generated by thermocouple 14 (FIG. 1) and its magnitude is read on voltmeter 24.

The value of $C_n$ is then determined from the equations $$J_{DC} = E^2/R(T) \quad (2)$$
$$C_n = V_{nDC}/J_{DC} \quad (3)$$

Beams of radiation $E_L$ and $E_x$ are parallel or perpendicular polarized to the plane of incidence of plates 11 and 12.

When the beam of radiation $E_L$ enters opening 22, we have $$E_1 = E_L(1-R_1) \quad (4)$$
$$E_2 = E_L R_1(1-R_2) \quad (5)$$

where
$R_1$ = reflectivity of plate 11
$R_2$ = reflectivity of plate 12

When the beam $E_L'$ enters opening 23, we have $$E_2' = E_L'(1-R_2) \quad (6)$$
$$E_1' = E_L' R_2(1-R_1) \quad (7)$$

where
$E_1'$ = energy absorbed by plate 11
$E_2'$ = energy absorbed by plate 12

From equations 4 to 7, we obtain $$R_1 R_2 = E_2 E_1'/E_1 E_2' \quad (8)$$

Since the E values with corresponding subscripts are derived from data obtained with the same instrumentation, systematic errors in evaluating $R_1 R_2$ tend to divide out. This may be seen by rewriting equation 8 as follows $$R_1 R_2 = \frac{E_{2T}(1+e_2) E'_{1T}(1+e_1)}{E_{1T}(1+e_1) E'_{2T}(1+e_2)} \quad (9)$$

where
$E_{1T}, E_{2T}$ = true values of $E_1$ and $E_2$
$E_{1T}', E_{2T}'$ = true values of $E_1'$ and $E_2'$
$e_1, e_2$ = errors introduced in measurements From equations 4 and 5 the energy in the input beam $E_L$ is $$E_L = \frac{E_1 + E_2}{1 - R_1 R_2} \quad (10)$$

and the energy in the output beam $E_x$ is
$$E_x = E_L R_1 R_2 \quad (11)$$

In a preferred embodiment of the present invention, plate mirrors 11 and 12 are made of high purity (99.9+ percent) single crystal aluminum, and the reflecting surfaces are in the (100) crystal face. The plates are oriented approximately 45° to the beam of radiation $E_L$ so that the reflecting surfaces of the plates are substantially parallel to each other. The beam is a pulsed laser beam having a wavelength of 0.6934$\mu$ and a pulse width of $5 \times 10^{-4}$ seconds. The beam is parallel polarized, i.e., the light vibrations are parallel to the plane of incidence.

In a typical operation, the beam of radiation $E_L$, which is parallel or perpendicular polarized, enters opening 22 and is reflected by mirrors 11 and 12 out of opening 23. The magnitudes of voltages $V_{11}$ and $V_{12}$ are read on voltmeters 24 and 25, respectively. The beam $E_L$ is then directed through opening 23 and is reflected out of 22, while the magnitudes of voltages $V_{11}'$ and $V_{12}'$ are read on the voltmeters.

Equation 1 is used to calculate $E_1, E_2, E_1'$ and $E_2'$. Equation 8 is employed with these values to determine $R_1 R_2$, and then equation 10 is employed to calculate the energy in beam $E_L$ and equation 11 and 12 the energy in $E_x$. Finally, after the values of $E_1, E_2,$ and $E_L$ have been determined, the reflectivities $R_1$ and $R_2$ of mirrors 11 and 12, respectively, are calculated with equations 4 and 5.

The following may be said about the typical embodiment described above:

1. Sensitivity is a function of the following parameters of plate mirrors 11 and 12: angle with incoming beam $E_L$, material, size, finish, and number of plate mirrors.

2. Complete measurements with voltmeter 24 and 25 can be taken in 2 to 5 seconds after beam $E_L$ impinges on plate mirrors 11 and 12, reducing errors from heat exchange evaluation and environmental temperature change. This time depends upon the size and the material of plate mirrors 11 and 12 and the amount and kind of solder used to attach thermocouples 14 and 15 to the plates.

3. A measurement may proceed if the temperatures of plates 11 and 12 are changing linearly, approximately 2 to 4 minutes between shots for the plates used in this embodiment.

4. Pulsed and cw, polarized and unpolarized, laser energy and power can be measured. For cw power measurements a good approximation of the energy is found by extrapolating the time-temperature curve to one-half the input time.

5. Energy densities of approximately 0.01 j./cm.$^2$ to 50 j./cm.$^2$ of parallel polarized pulsed laser light can be measured.

6. Estimated maximum power densities that can be measured are approximately 100 to 1,000 megawatts/cm.$^2$.

7. Estimated error $\leq$ 2 percent over the ranges given.

8. A calibrated beam $E_x$ is available, which is a high percentage of the incoming beam $E_L$ when plate mirrors 11 and 12 have high reflectivities.

9. Reflectivity of plates 11 and 12 may be easily calibrated with laser energy.

10. Using reliable normal reflectivity data and/or index of refraction and absorption coefficient data, one can determine the approximate wavelength range of a given material used in plate mirrors 11 and 12.

11. The reflectivity is a slowly varying function of the angle of incidence.

12. The desired measurements are made without changing the polarization of beam $E_L$.

The embodiment described here may be employed to measure the components of polarization parallel ($E_p$) and perpendicular ($E_s$) to the plane of incidence of beam of radiation $E_L$. The energy $E_L$ of the beam with these components is $$E_L = E_p + E_s \quad (13)$$

Figure 2:
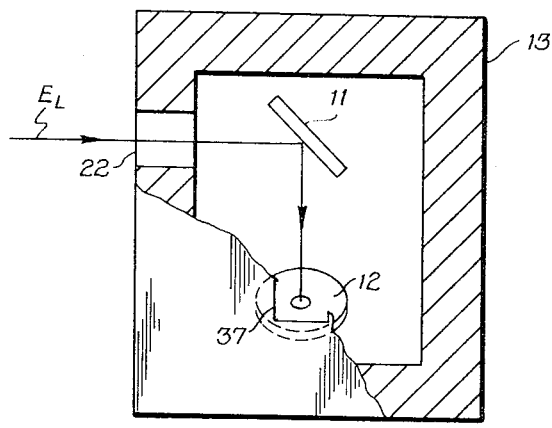
FIG. 2 illustrates the relationship between plate mirrors 11 and 12 in FIG. 1 after plate 12 has been rotated 90° around the beam of radiation reflected from plate 11.

Before the components are measured, plate mirror 12 in FIG. 1 is rotated 90° about the beam as an axis to the position shown in FIG. 2. At a 45° angle of incidence, the relationship between the parallel ($R_p$) and perpendicular ($R_s$) components of reflectivity for mirror 12 is $$R_s = \sqrt{R_p} \quad (14)$$

When beam $E_L$ is parallel polarized and plate mirrors 11 and 12 are similar, we have $$R_1 = R_2 = R_p \quad (15)$$

The components of reflectivity of mirrors 11 and 12 can be evaluated. However, corresponding components for the two mirrors are equal to a close approximation.

The energies $E_1''$ and $E_2''$ absorbed by plate mirrors 11 and 12, respectively, are $$E_1'' = E_p(1-R_p) + E_s(1-\sqrt{R_p}) \quad (16)$$
$$E_2'' = E_p R_p(1-\sqrt{R_p}) + E_s \sqrt{R_p}(1-R_p) \quad (17)$$

From equations 16 and 17, we have $$E_L = E_p + E_s = \frac{E''_1 + E''_2}{1 - R_p^{3/2}} \quad (18)$$

$$E_p = \frac{E_1''(\sqrt{R_p} + R_p) - E_2''}{(1 - R_p^{3/2})\sqrt{R_p}} \quad (19)$$

$$E_s = \frac{E_2''(1 + \sqrt{R_p}) - E_1'' R_p}{(1 - R_p^{3/2})\sqrt{R_p}} \quad (20)$$

For any angle of beam $E_L$ relative to plates 11 and 12, the energy of the beam is $$E_L = E_p + E_s = \frac{E_1'' + E_2''}{1 - R_p R_s} \quad (21)$$

$$E_p = \frac{E_1''(R_s)(1-R_p) - E_2''(1-R_s)}{(1-R_pR_s)(R_s-R_p)} \quad (22)$$

$$E_s = \frac{E_2''(1-R_p) - E_1''R_p(1-R_s)}{(1-R_pR_s)(R_s-R_p)} \quad (23)$$

The values of $R_p$ and $R_s$ are determined with parallel and perpendicular polarized beams, respectively, in the manner described above in connection with FIG. 1.

In a typical operation $R_1$ which is equal to $R_p$ is evaluated as set forth above in connection with FIG. 1. The beam of radiation $E_L$ is then directed through opening 22 and is reflected by mirrors 11 and 12 out of opening 37 (FIG. 2). The magnitudes of voltages $V_{11}$ and $V_{12}$ are read on voltmeters 24 and 25, respectively. Equation 1 is then used to calculate $E_1''$ and $E_2''$ and equations 19 and 20 to calculate $E_p$ and $E_s$, respectively.

I claim:

1. In a calorimeter wherein the energy in a beam of radiation is sampled,
a first and second plate mirror, each having a selected thermal conductivity and reflectivity and an optically finished reflecting surface,
the reflecting surface of said first plate mirror being positioned to reflect an impinging beam of radiation to the reflecting surface of said second plate mirror,
the reflecting surface of said second plate mirror being positioned to reflect an impinging beam, arriving from said first plate mirror, in a direction other than to the reflecting surface of the first plate mirror, said plate mirrors absorbing a portion of the energy in a beam of radiation impinging thereon,
means connected to said plate mirrors for developing a first and second signal having a magnitude dependent upon the level of energy absorbed by said first and second plate mirror, respectively, when a beam of radiation impinges on the plate mirrors, and
means for measuring the magnitudes of said first and second signals.

2. The calorimeter set forth in claim 1 including:
a first and second heater element positioned to apply heat to said first and second plate mirror, respectively,
a direct current voltage source,
means for applying the output of said voltage source across said first and second heater element for a selected time interval, whereby a first and second voltage is developed across said first and second element, respectively, and
means for measuring the magnitudes of the first and second voltage.

3. The calorimeter set forth in claim 1 wherein:
said first and second plate mirror are initially positioned so that their reflecting surfaces are substantially parallel to each other and the beam of radiation impinges on said reflecting surfaces at a selected angle of incidence, and
said second plate mirror is rotatable 90° around the axis of the beam of radiation to another position where the beam impinges on the reflecting surface of said second plate mirror at said selected angle of incidence.

4. The calorimeter set forth in claim 1 wherein:
said first and second plate mirror are positioned at approximately 45° relative to the impinging beam of radiation so that $R_s = \sqrt{R_p}$ where 5. The calorimeter set forth in claim 1 wherein the means for developing the first and second signal comprises:
a first and second thermocouple connected to the first and second plate mirror, respectively.

6. The calorimeter set forth in claim 1 wherein:
said first and second plate mirror are positioned in an enclosure fabricated of thermal conductive material,
said enclosure having a first and second opening positioned relative to the reflecting surfaces of said first and second plate mirror, respectively, in such a way that a beam of radiation may be directed through said first opening to the reflecting surface of said first plate or through said second opening to the reflecting surface of said second plate,
a first and second electrical insulating and thermal conductive means positioned on said enclosure, and
wherein the means for developing the first and second signals comprises:
a first thermocouple having a hot junction connected to said first plate mirror and a cold junction connected to said first electrical insulating and thermal conductive means, and
a second thermocouple having a hot junction connected to said second plate mirror and a cold junction connected to said second electrical insulating and thermal conductive means.

7. The calorimeter set forth in claim 6 including:
a first and second heater element positioned to apply heat to said first and second plate mirror, respectively,
a direct current voltage source,
means for applying the output of said voltage source across said first and second heater element for a selected time interval, whereby a first and second voltage is developed across said first and second element, respectively, and
means for measuring the magnitudes of the first and second voltage.

8. The calorimeter set forth in claim 6 wherein:
said first and second plate mirror are initially positioned so that their reflecting surfaces are substantially parallel to each other and a beam of radiation impinges on said reflecting surfaces at a selected angle of incidence, and
said second plate mirror is rotatable 90° around the axis of the beam of radiation to another position where the beam impinges on the reflecting surface of said second plate mirror at said selected angle of incidence.

9. The calorimeter set forth in claim 6 wherein:
said first and second plate mirror are positioned at approximately 45° relative to the impinging beam of radiation so that $R_s = \sqrt{R_p}$ where $R_s$ and $R_p$ represent the perpendicular and parallel components of reflectivity, respectively, for said first and second plate mirror.

* * * * *

UNITED STATES PATENT OFFICE
CERTIFICATE OF CORRECTION

Patent No. 3,622,245         Dated November 23, 1971

Inventor(s) Alvin L. Rasmussen

It is certified that error appears in the above-identified patent and that said Letters Patent are hereby corrected as shown below:

Claim 4, line 4, after "where" insert --$R_s$ and $R_p$ represent the perpendicular and parallel components of reflectivity, respectively, for said first and second plate mirror.--.

Signed and sealed this 18th day of April 1972.

(SEAL)
Attest:

EDWARD M. FLETCHER, JR.        ROBERT GOTTSCHALK
Attesting Officer              Commissioner of Patents